United States Patent Office 3,171,727
Patented Mar. 2, 1965

3,171,727
FRESH WATER RECOVERY BY FRACTIONAL CRYSTALLIZATION
David Brown, New York, and John White Colton, Pelham Manor, N.Y., assignors to Halcon International, Inc., a corporation of Delaware
Filed Jan. 6, 1959, Ser. No. 785,157
2 Claims. (Cl. 62—58)

This application relates to processes for the conversion of saline water to fresh water and more particularly to processes utilizing evaporative refrigeration systems for the preparation of fresh water from sea water or saline water.

It is known in the art that fresh water may be prepared from saline water by various refrigeration procedures and distillation methods. Unfortunately, such methods heretofore known demand large energy requirements, result in large refrigeration losses, utilize costly power resources and have high maintenance costs. These large capital and operating cost requirements result in uneconomic methods for the production of fresh water so as to be prohibitive in many cases.

It is a feature of the present invention to utilize a combination of elements which result in an optimum economic conversion of saline water to fresh water.

It is another feature of the present invention to utilize refrigeration systems which provide maximum energy savings and to operate the refrigeration compressors at optimum economic compression ratios.

It is still another feature of the present invention to eliminate refrigerant losses.

It is still another feature of the present invention to operate the refrigeration systems at low temperature levels and to utilize the heat energy from the refrigeration systems to recover refrigerant ordinarily lost during operation of the process.

Another feature of the invention is the step of deaerating the feed sea water in order to avoid the accumulation of noncondensables in the circulating refrigerant.

Another feature of the present invention is an arrangement of heat exchangers in the process to allow maximum possible cooling so as to minimize the refrigerant duty requirements in the process.

Another feature of the invention is a method of separating crystallized ice from brine so as to produce fresh water of high purity.

Figure 1:
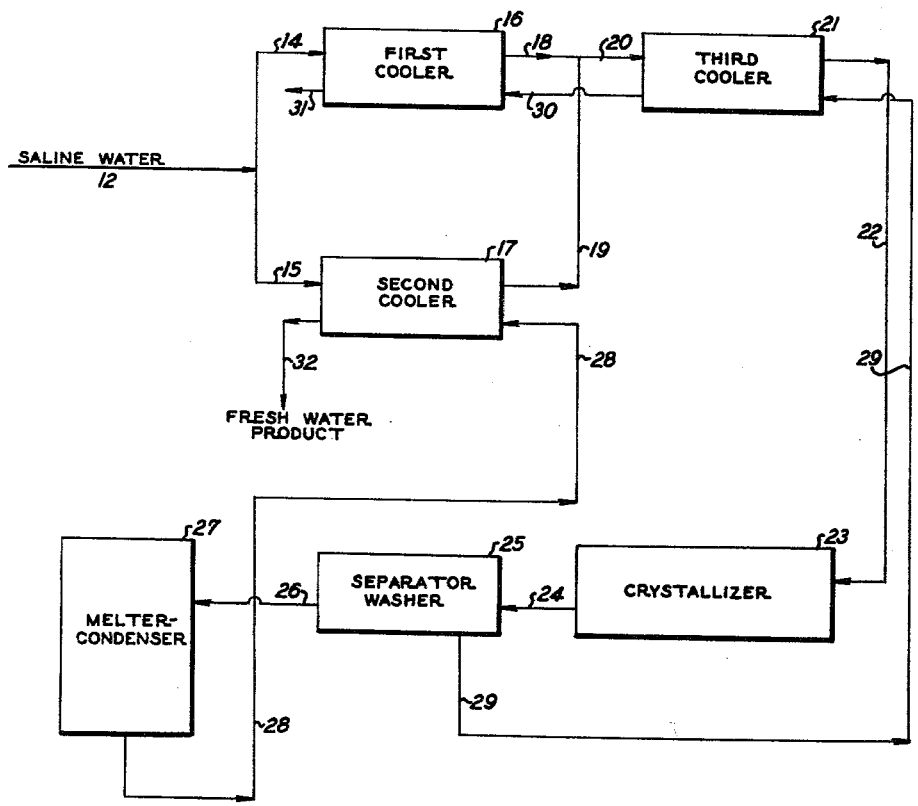
FIGURES 1 and 2 illustrate schematically preferred embodiments of the invention in which the equipment conventionally employed in conveying, heating, melting, crystallizing, compressing, etc., are not shown as they form no part of the invention.

Referring to FIGURE 1, saline water enters through line 12. A portion of the saline water is passed through line 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23. The saline water is crystallized by methods such as evaporative freezing in the crystallizer in order to produce ice crystals and brine. The ice crystals and brine are led through line 24 into separator-washer 25 and after separation of the brine and washing to remove entrained brine, the ice crystals are passed through line 26 into melter-condenser 27 where by direct heat exchange the crystals are melted to form fresh water which is passed through line 28 into the cooling side of the second cooler 17 in order to cool the saline water passing into the second cooler. The fresh water passes out of the second cooler 17 through line 32 and is taken off as fresh water product. The brine which is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

Figure 2:
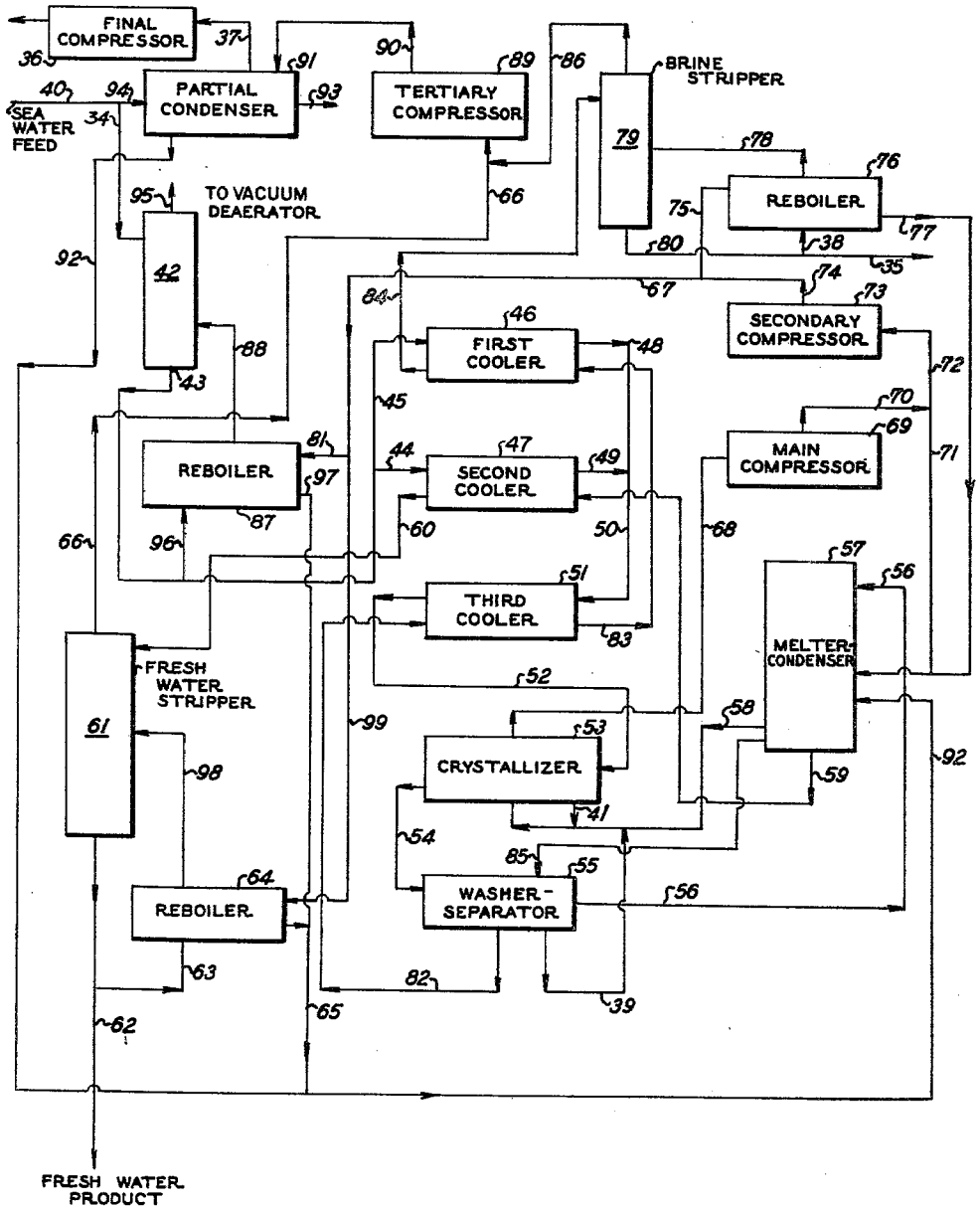
Figure 3:
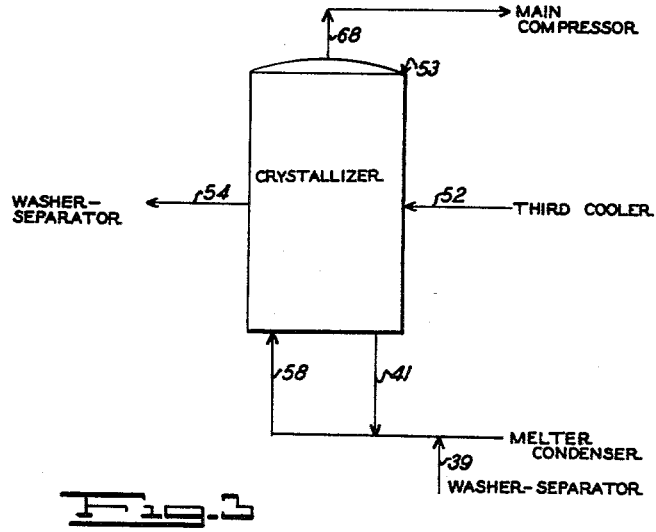
FIGURES 3 to 5 show details of the crystallizer, melter condenser and washer-separator, respectively, illustrated diagrammatically in FIGURE 2.
Figure 4:
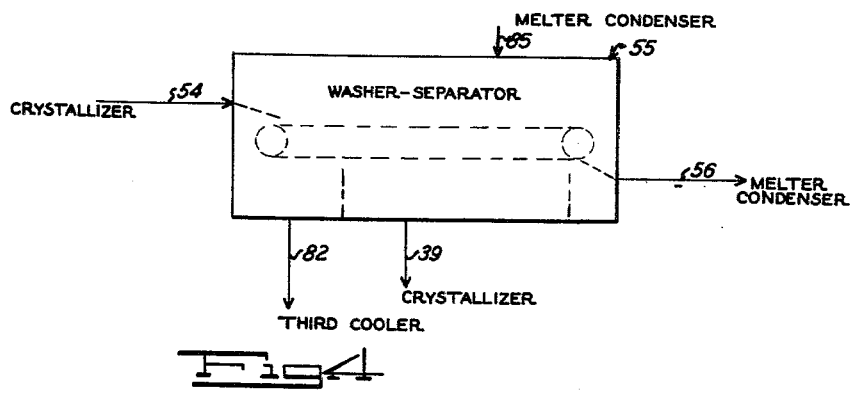
Figure 5:
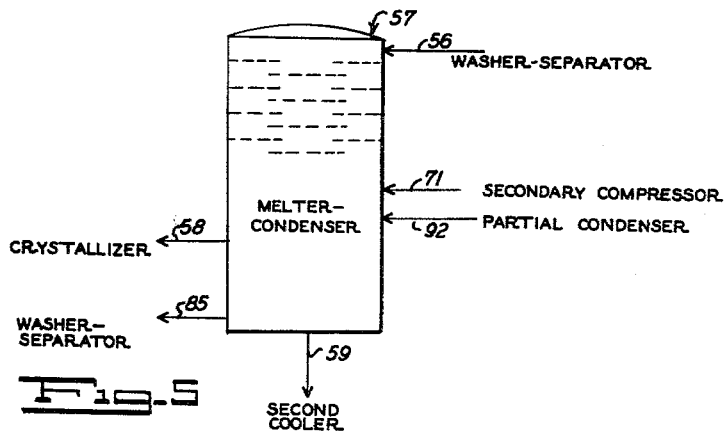

Referring to FIGURE 2, sea water enters through line 40 and the bulk of the sea water passes via line 34 into deaerator 42. Air entrained in the sea water is stripped in deaerator 42 and removed overhead through line 95. The deaerated sea water passes out of the bottom of deaerator 42 through line 43 and a portion of this deaerated sea water is passed through line 44 into a first cooler 46. The remaining portion is passed through line 45 into a second cooler 47. The cooled outlet deaerated sea water from both coolers is led through lines 48 and 49 and combined in line 50 and passes into a third cooler 51. The outlet cooled sea water from the third cooler 51 is passed through line 52 into crystallizer 53. A water-immiscible refrigerant, such as liquid isobutane or n-butene-1 or mixtures thereof, is passed into crystallizer 53 and directly contacted with the deaerated sea water so as to produce ice crystals, as a result of vaporization of the refrigerant, and brine.

The mixture of ice crystals and brine is passed through line 54 into a washer-separator 55. The bulk of the brine is separated from the ice crystals by gravity separation methods and the ice crystals containing entrained brine are countercurrently washed in the washer-separator 55 by contact with wash water passing into washer-separator 55 through line 85. A suitable method of washing the ice crystals is to pass the ice crystals continuously onto a moving belt having means for countercurrently washing said ice crystals and separating wash liquor and brine from said ice crystals. Part of the brine and wash water containing dissolved refrigerant is drained and passed into crystallizer 53 through line 39.

The ice crystals passing out of washer-separator 55 through line 56 are passed into melter-condenser 57 where they are converted to fresh water. Part of the fresh water is passed via line 85 into washer-separator 55 for use as wash water. The remainder passes out of the bottom of melter-condenser 57 through line 59.

The vaporized refrigerant which is formed in crystallizer 53 as a result of contact with the deaerated cooled sea water passes out of the crystallizer through line 68 and is led into a main compressor 69 where the vaporized refrigerant is compressed and passes out of the compressor through line 70. A portion of the compressed refrigerant is led through line 71 into melter-condenser 57 where it is directly contacted with the ice crystals passing into melter-condenser 57 through line 56. As a result of this direct contact the ice crystals are melted and pass out of the melter-condenser through line 59. The refrigerant vapors which are passed into melter-condenser 57 are condensed as a result of the contact with the ice crystals and pass out of melter-condenser 57 through line 58. This refrigerant condensate is led back into the crystallizer 53 for further evaporative freezing.

Unvaporized refrigerant and a slurry of ice crystals in aqueous brine in the crystallizer 53 are recycled through line 41 to the crystallizer.

The greater part of the brine and wash water passing out of the washer-separator 55 is led through line 82 into the cooling side of the third cooler 51 and is then led through line 83 through the cooling side of the first cooler 46 and out of the cooler through line 84.

The remaining portion of the compressed refrigerant passing out of compressor 69 through line 70 is led through line 72 into secondary compressor 73 where it is further compressed. The further compressed refrigerant passing out of the secondary compressor 73 is passed into two lines, 75 and 67.

The brine passing through line 84 is led into a brine stripper 79 and dissolved refrigerant is removed overhead as vapor through line 86.

The further compressed refrigerant stream passing through line 75 is passed into reboiler 76 and boils water under vacuum which passes out of reboiler 76 through line 78 as a mixture of brine and steam into stripper 79. The steam is passed in counter-current flow against the downflowing brine to strip out the dissolved refrigerant. The stripped brine passes out of the bottom of stripper 79 through line 80. A portion of the stripped brine is passed through line 38 into reboiler 76 to supply water which is boiled to produce steam. The remainder of the stripped brine is discharged as waste through line 35.

The further compressed refrigerant passing into reboiler 76 condenses during the steam generation step and passes out through line 77 and the condensate is passed into melter-condenser 57.

The fresh water passing out of the bottom of melter-condenser 57 through line 59 is passed through the cooling side of second cooler 47 and is then led through line 60 into fresh water stripper 61. Dissolved refrigerant is removed overhead as vapor through line 66.

The portion of further compressed refrigerant passing through line 67 is passed into two lines, 81 and 99.

The further compressed refrigerant passing through line 99 is passed into reboiler 64 and boils water under vacuum which passes out of reboiler 64 through line 98 as a mixture of steam and water into stripper 61 where the steam is passed in counter-current flow with the downcoming fresh water to strip out the dissolved refrigerant. The stripped fresh water passes out of the bottom of stripper 61 through line 62 as fresh water product. A portion of the fresh water product is passed through line 63 into reboiler 64 to supply the water which is boiled to produce steam. The further compressed refrigerant passing into reboiler 64 condenses during the steam generation step and passes out through line 65. The condensate is passed into melter-condenser 57.

The further compressed refrigerant stream passing through line 81 is passed into reboiler 87 and boils sea water under vacuum which passes out through line 88 as a mixture of steam and sea water into deaerator 42 where the steam is passed in counter-current flow with sea water in order to remove entrained air from the sea water which passes out of the deaerator through line 95.

A portion of the deaerated sea water passing out of the bottom of deaerator 42 through line 43 is passed via line 96 into reboiler 87 to supply water which is boiled to produce steam for the deaeration of the sea water feed.

The further compressed refrigerant passing into reboiler 87 condenses during the steam generation step and passes out through line 97 and passed into melter-condenser 57.

The vaporized refrigerant passing out of strippers 61 and 79 through lines 66 and 86 is passed into tertiary compressor 89 and the compressed refrigerant is then passed through line 90 into partial condenser 91.

A small portion of the sea water entering line 40 is passed via line 94 into the cooling side of partial condenser 91. Water vapors contained in the compressed refrigerant are condensed in partial condenser 91 and the condensate containing some condensed refrigerant is passed through line 92 into melter-condenser 57. The sea water passing into condenser 91 passes out through line 93 to waste.

Uncondensed refrigerant and water vapors pass from partial condenser 91 through line 37 to final compressor 36 for final recovery of refrigerant by condensation.

In one embodiment of the invention the relative proportions of deaerated saline water passing into the second cooler and the first cooler are adjusted such that the temperatures of the deaerated saline water passing out of each cooler are approximately equal.

In another embodiment of the invention the portion of the saline water passing into the first cooler is approximately equal to the portion of the waste brine discharged from the process.

In another preferred embodiment of the invention the crystallizing, washing and melting steps are carried out under a continuous atmosphere of the refrigerant.

Another preferred embodiment of the invention comprises, in a sequential operation, the steps of deaerating saline water, passing a portion of the deaerated saline water into a first cooler, passing the remaining portion of the deaerated saline water into second cooler, passing the outlet deaerated saline water from each cooler into a third cooler, passing the outlet deaerated saline water from said third cooler into a crystallizing zone, contacting said deaerated saline water in said crystallizing zone with a water-immiscible refrigerant boiling in the range of from about 0° F. to about 35 °F., evaporatively freezing said deaerated saline water in said crystallizing zone at a temperature of from about 25.5° F. to about 27.5° F. to obtain ice crystals and brine, passing the mixture of ice crystals and brine continuously onto a moving belt having means for separating the bulk of said brine from said ice crystals and for countercurrently washing said ice crystals containing entrained brine and separating wash liquor and said entrained brine from said ice crystals, passing said brine first through the cooling side of said third cooler and then through the cooling side of said first cooler, stripping dissolved refrigerant from said brine, melting said ice crystals to obtain fresh water, passing said fresh water through the cooling side of said second cooler, stripping dissolved refrigerant from said fresh water and recovering fresh water product.

Another embodiment comprises, in a sequential operation, the steps of deaerating saline water, passing a portion of the deaerated saline water into a first cooler, passing the remaining portion of the deaerated saline water into a second cooler, passing the outlet deaerated saline water from each cooler into a third cooler, passing the outlet deaerated saline water from said third cooler into a crystallizing zone, contacting said deaerated saline water in said crystallizing zone with a water-immiscible refrigerant boiling in the range of from about 0° F. to about 35° F., evaporatively freezing said deaerated saline water in said crystallizing zone to obtain ice crystals and brine, separating said ice crystals from said brine, removing the vaporized refrigerant from said crystallizing zone, compressing said refrigerant, passing said brine first through the cooling side of said third cooler and then through the cooling side of said first cooler, passing the separated ice crystals into a melting zone, passing a portion of the compressed refrigerant into said melting zone, contacting said ice crystals with said portion of refrigerant in said melting zone to melt said ice crystals and obtain fresh water, further compressing the remaining portion of said compressed refrigerant, removing said fresh water from said melting zone, passing said fresh water through the cooling side of said second cooler, stripping dissolved refrigerant from said fresh water and recovering fresh water product, stripping dissolved refrigerant from the brine passing out of the cooling side of said first cooler, compressing the stripped refrigerants, condensing said compressed stripped refrigerants, passing the stripped refrigerant condensates to the melting zone, evolving steam by indirectly contacting the further compressed refrigerant with water under vacuum, said further compressed refrigerant condensing during the indirect contacting step, utilizing said steam to strip said dissolved refrigerant from said fresh water and from the brine passing out of the cooling side of said first cooler and to deaerate said saline water and passing the further compressed refrigerant condensate to said melting zone.

In another preferred embodiment of the invention the ice crystals are separated from the brine by passing the mixture of ice crystals and brine into a washing column and countercurrently contacting said mixture in said washing column with wash liquor, removing said ice crystals from the top section of said washing column and removing said brine and wash liquor from the bottom section of said washing column.

In another preferred embodiment of the invention the quantity of water used for washing the ice crystals is at least as great as the quantity of brine entrained in said ice crystals. This embodiment is particularly desirable when countercurrent washing of the ice crystals on a moving belt is utilized or when countercurrent washing in a washing column is employed.

In still another preferred embodiment of the invention the refrigerant utilized in the process comprises isobutane or n-butene-1 or mixtures thereof.

Example 1

223 g.p.m of 52° F. raw sea water are fed into a deaeration column operated at 10 mm. Hg and air is stripped and removed overhead. The deaerated sea water passes out of the bottom of the column at 54° F. and is split into two streams, approximately one-third passing through a first cooler and the remainder passing through a second cooler. The coolers are sized such that the deaerated waters passing out of both coolers are at the same temperature, 38.2° F. The two outlet streams are combined and passed into a third cooler where they are cooled to a temperature of 34.2° F. and passed into a crystallizer. 143 g.p.m. of isobutane are introduced into the crystallizer and contacted with the cooled deaerated water to form ice crystals and brine. The temperature in the bulk of the liquid in the crystallizer is maintained at 26.3° F. by recirculating the liquid through the crystallizer. 43,000 lbs./hr. of vaporized isobutane are removed overhead at a temperature of 23.3° F. and passed into a main compressor operated at a compression ratio of 1.25. A mixture of ice crystals and brine containing 40,300 lbs./hr. of ice crystals is passed onto a continuous moving filter belt from which the bulk of the brine is drained by gravity flow in a first section of the moving belt. The ice crystals containing approximately 17,700 lbs./hr. of entrained brine are then washed with about 23,000 lbs./hr. of water three times in successive stages. The ice crystals are passed into a melter-condenser where they are contacted with the isobutane passing out of the compressor at a pressure of 24.2 p.s.i.a. and melted to form fresh water. The isobutane condenses during the contacting step. Part of the fresh water is passed into the washer-separator to supply the 23,000 lbs./hr. of wash water and the remainder passes out of the bottom of the melter-condenser at 33° F. and is lead through the cooling side of the second cooler. The fresh water leaves the outlet side of the second cooler at 48.8 F. and is stripped of dissolved isobutane in a fresh water stripper operated at 10 mm. Hg. The stripped fresh water is removed from the bottom of the stripper at a rate of 35,000 lbs./hr. and collected as product. There is obtained an overal yield of raw sea water to fresh water of approximately 33.3% by weight. The brine which is separated from the ice crystals on the moving belt is passed through the cooling side of the third cooler at a rate of 139 g.p.m. at a temperature of 27° F., and is then passed into the cooling side of the first cooler at a temperature of 33° F. The brine leaves the outlet side of the first cooler at 48.6° F. and is stripped of dissolved isobutane in a stripper operated at 10 mm. Hg and passes out of the bottom of the stripper at 54° F. as spent brine. The stripped isobutane from the brine and the fresh water strippers is compressed, condensed and passed back into the melter-condenser.

Although the use of isobutane or n-butene-1 or mixtures thereof is disclosed as preferred refrigerants, it will be readily understood that any water-immiscible refrigerant boiling broadly in the range of from about 0 to about 35° F., desirably 10 to 30° F., and preferably 13 to 25° F. can be utilized in the process. Moreover, it is apparent that mixtures of such refrigerants can also be employed.

It is a feature of the present invention that optimum economic conversions of saline water to fresh water are obtained when the crystallization is carried out at a temperature of from about 24.2° F. to about 27.5° F., desirably 25.5 to 27.5° F. and preferably about 26.3° F. Within these temperature ranges, optimum economic crystallizations of from about 20 to about 50% of the saline water are obtained. Below a conversion of 20% which is obtained at 27.5° F., the amount of saline water handled becomes excessive, leading to high capital investment in cooling surface and crystallizer volume, and high energy costs for pumping and crystallizer recirculation; above a conversion of 50% which is obtained at 24.2° F. the refrigeration compression ratio becomes excessively high, leading to high energy costs for refrigeration.

For isobutane, when the temperature driving force in the crystallizer is 3° F. and the temperature driving force in the melter-condenser is 3° F. the compression ratios required in the main compressor in order to maintain optimum economic conditions are broadly 1.22 to 1.30, desirably 1.22 to 1.27 and preferably 1.25. If water vapor is employed as the refrigerant using the same 3° F. driving forces in both the crystallizer and melter-condenser, the compression ratios required are broadly from 1.48 to 1.76, desirably 1.48 to 1.67 and preferably 1.61. It will, therefore, be apparent to one skilled in the art that the choice of compression ratios to be utilized in the conversion processes heretofore described will be dependent upon the refrigerant selected for use in the process.

The refrigerant can be any single component of the proper volatility such as isobutane or perfluorocyclo butane, but it could consist of mixtures of compounds which have similar individual volatilities, since such mixtures have a narrow spread between dew point and bubble point. A wide spread between dew point and bubble point is undesirable because it requires additional compressor horsepower since the circulating refrigerant stream must be compressed from the crystallizer as a vapor at its dew point to a pressure at which it will all condense in the melter-condenser to form a liquid at its bubble point. Mixtures of low relative volatility, such as isobutane and butene-1, whose relative volatility is only 1.3, are acceptable however.

The temperature of the refrigerant at its evaporating pressure in the crystallizer should not be more than broadly 15° F., desirably 6° F. and preferably 3° F. lower than the temperature of the freezing deaerated saline water mixture in the crystallizer as measured in the bulk of the liquid in order to minimize compression energy requirements. This minimum differential temperature can be maintained by recirculating the freezing deaerated saline water and liquid refrigerant mixture through the crystallizer at a rate of at least 10 volumes and preferably about 50 volumes of recirculating mixture per volume of feed deaerated saline water per hour in order to maintain a large surface area of contact and intimacy of contact between the refrigerant and the water to be crystallized. The minimum differential temperature can also be maintained by intense mechanical agitation within the crystallizer.

A further advantage is effected as a result of recirculating the freezing deaerated saline water and liquid refrigerant mixture through the crystallizer since recirculation permits classification of the ice crystals such that the larger crystals can be passed out of the crystallizer and separated for conversion to fresh water while the smaller crystals can be recirculated to the crystallizer.

The temperature of the refrigerant at its condensing pressure in the melter-condenser should not be more than broadly 15° F., desirably 6° F. and preferably 3° F. higher than the temperature in the body of the melting ice. This differential temperature can be maintained by substantially eliminating any liquid hydrostatic head in the melter-condenser by maintaining a continuous vapor space in the melter-condenser.

The refrigerant utilized in the process should have a dew point less than about 20° F. higher than its bubble point at the same pressure.

In another preferred embodiment of the present invention there is maintained a liquid residence time in the crystallizer of about 1 to 12 hours in order to produce optimum sized ice crystals for easy drainage and washing.

The volatile refrigerant employed in the process may be water vapor itself, but in this case the crystallizer must be operated under deep vacuum. The volume of vapor handled becomes over 120 times that when utilizing isobutane. The capital investment for refrigeration compressors becomes enormous because of their huge capacity, and this poses a serious economic handicap on the water vapor compression. Furthermore, it is extremely difficult to overcome hydrostatic head in a liquid-full crystallizer when operating at such low absolute pressures. It would be necessary to revert to a vapor-full crystallizer which has little residence time in which to grow properly sized crystals, as heretofore mentioned. Therefore, it is preferred to select a refrigerant whose vapor pressure is close to one atmosphere at the freezing point of the brine. Pressures in slight excess of one atmosphere are preferred to slight vacuums because of mechanical design considerations.

Pressure drops in the compressor suction and discharge lines should be minimized by careful attention to mechanical design, avoidance of sharp bends, avoidance of abrupt changes in sectional area, and use of large diameter lines to afford low vapor velocities. Pressure drops are an economic handicap since they require a compensating increase in compression ratio with concomitant increase in compressor energy requirements.

It is intended in the specification that for any apparatus disclosed as being utilized in the process, a plurality of such apparatuses operated in parallel can be substituted where such a plurality would be advantageous from engineering design considerations. Furthermore, each of the three coolers shown in FIGURE 2 can be a plurality of heat exchangers operated in series, parallel, or a combination of series in parallel.

Although the use of sea water is described in Example 1 and FIGURE 2, it is readily apparent that the process can be utilized for any saline water when conversion to fresh water is desired. The term "saline water" is intended to embrace any water containing more than 500 p.p.m. of dissolved salts, and as used in the specification and claims includes "sea water."

In view of the foregoing disclosures, variations and modifications thereof will be apparent to one skilled in the art, and it is intended to include within the invention all such variations and modifications except as do not come within the scope of the appended claims.

What is claimed is:

1. A process for separating fresh water from saline water which comprises: passing a first portion of saline water into a first cooler; passing a second portion of saline water into a second cooler; passing the outlet saline water from both of said coolers to a third cooler; passing the outlet saline water from said third cooler to a crystallizing zone; contacting said saline water in said crystallizing zone with a water-immiscible refrigerant boiling in the range of 0° F. to about 35° F.; evaporatively freezing said saline water in said crystallizing zone, thereby forming ice crystals and brine; separating said ice crystals from said brine; melting said ice crystals, thereby producing fresh water; transferring heat from said second portion of saline water to said fresh water by indirect contact in said second cooler; transferring heat first from both portions of said saline water and then from said first portion of saline water to said brine in said third cooler and said first cooler, respectively; and adjusting the relative amount of saline water passing to said first cooler and second cooler such that the temperatures of the saline water passing out of each cooler are approximately the same.

2. The process of claim 1 wherein said ice crystals are washed countercurrently by continuous passage onto a moving belt, wherein a first section of the moving belt has means for separating said ice crystals from the bulk of the brine, and wherein a second section of said moving belt is provided with means for countercurrently washing said ice crystals with water, and means for separating the wash liquor from said ice crystals.

References Cited in the file of this patent

UNITED STATES PATENTS

| | | |
|---|---|---|
| 1,976,204 | Voorhees et al. | Oct. 9, 1934 |
| 2,020,719 | Bottoms | Nov. 12, 1935 |
| 2,315,762 | Ax et al. | Apr. 6, 1943 |
| 2,436,218 | Malcolm | Feb. 17, 1948 |
| 2,632,314 | Vance | Mar. 24, 1953 |
| 2,683,178 | Findlay | July 6, 1954 |
| 2,821,304 | Zarchin | Jan. 28, 1958 |

FOREIGN PATENTS

| | | |
|---|---|---|
| 70,507 | Norway | June 3, 1946 |
| 217,766 | Australia | Oct. 16, 1958 |

OTHER REFERENCES

Gilliland: "Fresh Water for the Future," Industrial and Engineering Chemistry, volume 47, Number 12, December 1955, pages 2410–2422.

Development of a Direct Freezing Continuous Wash-Separation Process for Saline Water Conversion, by Carrier Corporation, Report #23, January 1959, pages 1–3 and FIGURES 1 and 2.